United States Patent Office 3,592,877
Patented July 13, 1971

---

3,592,877
VINYL RESINS PLASTICIZED WITH SOLID LINEAR POLYMERS OF LACTONES
Dennis H. Mullins, St. Albans, W. Va., assignor to Union Carbide Corporation, New York, N.Y.
No Drawing. Continuation-in-part of applications Ser. No. 639,054, May 17, 1967, Ser. No. 319,677, Oct. 29, 1963, and Ser. No. 168,233, Jan. 23, 1962. Said application Ser. No. 639,054 being a continuation of application Ser. No. 319,677, which is a continuation-in-part of application Ser. No. 168,233. This application Apr. 1, 1969, Ser. No. 812,353
Int. Cl. C08f 29/22, 37/18, 45/36
U.S. Cl. 260—874            35 Claims

ABSTRACT OF THE DISCLOSURE

A vinyl resin plasticized with a plasticizing amount of relatively high molecular weight, solid, linear polymers of lactones.

---

This application is a continuation-in-part of application Ser. No. 639,054, filed May 17, 1967, a continuation-in-part of application Ser. No. 319,677, filed Oct. 29, 1963, and a continuation-in-part of application Ser. No. 168,233, filed Jan. 23, 1962, all by D. H. Mullins. Application Ser. No. 639,054 is a continuation of Ser. No. 319,677, which is a continuation-in-part of application Ser. No. 168,233. All of the aforesaid applications are assigned to a common assignee and all have been abandoned.

This invention relates to plasticized compositions and to a process for their preparation. In one aspect, this invention is directed to plasticized vinyl resins which exhibit a combination of properties not heretofore obtainable in polymeric compositions.

A major shortcoming of externally-plasticized, flexible resin compositions, e.g., poly(vinyl halides), is the tendency of the plasticizer to escape from the plasticized composition by volatilization or by extraction processes. These tendencies become aggravated or more pronounced at elevated temperatures such as in fields of applications in which the plasticized composition is used, for example, as an insulating medium for wire and cable. Contact with various liquid media, e.g., water, oil, fats, etc., also can result in the extraction or loss of the plasticizer in the plasticized composition. Loss of the plasticizer eventually can cause undesirable stiffening of the plasticized composition which ultimately leads to failure by cracking, excessive stiffening, shrinkage, and the like.

Fabricators of so-called plasticized vinyls have long sought a permanent plasticizer that would be essentially non-volatile and non-extractable. Some progress in this direction has been made by using relatively high molecular weight butadiene-acrylonitrile rubbers as plasticizers, but shortcomings in color, clarity, resistance to oxidative attack, light stability, and processing characteristics have limited the use and effectiveness of these rubbers in flexible vinyl compositions. Likewise, relatively high molecular weight, viscous liquid polyesters have met with some success, but difficulties in handling these viscous polyesters, and high cost, have placed limitations on their uses.

Accordingly, one or more of the following objects will be achieved by the practice of the instant invention. It is an object of this invention to provide novel plasticized compositions which exhibit a combination of properties not heretofore obtainable in polymeric compositions. Another object of this invention is to provide novel plasticized vinyl resin compositions which have the combined characteristics of very low brittle temperatures, excellent permanence, and low volatility of the plasticizer. A further object of this invention is to provide poly(vinyl halide) compositions which have been plasticized with solid, rubbery, polymerized lactones. Another object of this invention is to provide a process for preparing the aforementioned plasticized compositions. These and other objects will readily become apparent to those skilled in the art in the light of the teachings herein set forth.

In a broad aspect, the invention contemplates the preparation of novel plasticized polymer compositions, both the plasticizers and the polymer compositions being described in detail hereinafter. These novel plasticized polymer compositions, especially the novel plasticized poly(vinyl halides), exhibit a combination of highly desirable properties which heretofore have been unattainable in plasticized compositions. The novel plasticized polymer compositions exhibit vastly superior and highly outstanding low temperature impact strength, and an unexpectedly high degree of permanence. Excellent flexibility at temperatures below 0° C. and extraordinary brittle temperatures as low as −65° C., and lower, also are characteristic of the novel plasticized polymer compositions. In addition, these novel plasticized compositions exhibit very low volatility, extremely high resistance to oil and water extraction, excellent color and processability, and superior resistance to staining. The combination of the above exemplified, unexpected and unobvious characteristics possessed by the novel plasticized polymer compositions stand in marked contrast to polymer compositions plasticized with conventional plasticizers, e.g., dioctyl phthalate. Moreover, the combination of highly favorable and superior properties which accrue when plasticizing, for example, poly(vinyl chloride), with the plasticizers contemplated by the invention is not achieved when plasticizing the same system with the corresponding relatively low molecular weight plasticizers.

The plasticizers contemplated in the invention are high molecular weight solid, tough, rubbery linear polymers, i.e., homopolymers, copolymers, terpolymers, and the like, of various cyclic esters which contain 4, 6, 7 or 8 atoms in the chain of the cyclic ester nucleus. These linear polymers are characterized by the following recurring structural unit:

(I) 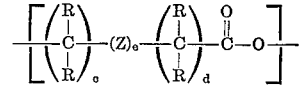

wherein each R, individually, can be hydrogen, alkyl, alkoxy, or alkoxyalkyl; wherein subscripts $c$ and $d$, individually, are integers which have a value greater than zero and less than 4; wherein the sum of $c$ and $d$ is a whole number greater than 1 and less than 6, preferably greater than 2 and less than 5; wherein $e$ has a value of zero or 1; and wherein Z is an oxy group, i.e., —O— group, or the unit

the R variables of said unit having the same values as above; with the provisos that (a) no more than three R variables which are attached to the carbon atoms contained within the structural unit depicted by Formula I supra are groups other than hydrogen, (b) when $e$ is one the sum of $c$ plus $d$ is greater than 2, and (c) $e$ is not zero throughout the entire polymer. Illustrative R radicals include, for example, methyl, ethyl, n-propyl, isopropyl, n-butyl, sec-butyl, t-butyl, n-pentyl, 2-ethylhexyl, n-octyl, n-dodecyl, octadecyl, methoxy, ethoxy, n-propoxy, isopropoxy, n-butoxy, sec-butoxy, t-butoxy, n-pentoxy, 2-ethylhexoxy, n-octoxy, n-decoxy, n-dodecoxy, octadecoxy, methoxymethyl, ethoxymethyl, methoxyethyl, ethoxyethyl, methoxypropyl, propoxypropyl, and the like.

The high molecular linear polymers which have the recurring structural unit shown in Formula I supra are further characterized as follows. The linear homopolymers which are composed solely of carbon atoms and ester groups, i.e.,

in the chain of the recurring structural unit have a reduced viscosity value in the range of from about 0.8 to about 7.0, and higher, preferably from about 1.0 to about 5.0, and more preferably still from about 1.2 to about 4.0, as determined at a concentration of 0.2 gram of said homopolymer per 100 milliliters of chloroform at 30° C. To illustrate the various linear lactone homopolymers which are contemplated, the following recurring units are set forth structurally below.

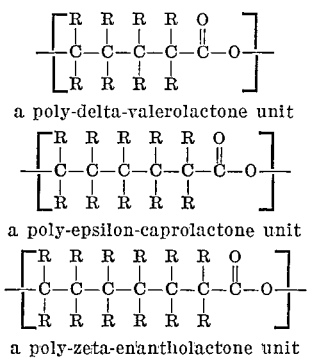

a poly-delta-valerolactone unit a poly-epsilon-caprolactone unit a poly-zeta-enantholactone unit The linear homopolymers which are composed solely of carbon atoms, an oxy group (—O—), and an ester group

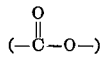

in the chain of the recurring structural unit have a reduced viscosity value in the range of from about 0.25 to about 3.0, and higher, preferably from about 0.3 to about 2.0, as determined at a concentration of 0.4 gram of said homopolymer per 100 milliliters of chloroform at 30° C. To illustrate these various linear oxalactone homopolymers which are contemplated, the following recurring units are structurally depicted below.

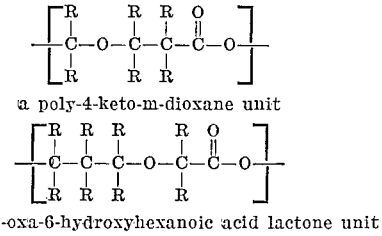

a poly-4-keto-m-dioxane unit a poly13-oxa-6-hydroxyhexanoic acid lactone unit

It is readily apparent that the linear copolymers, terpolymers, and the like, are also characterized by the recurring structural unit shown in Formula I supra. However, in contrast to the linear homopolymers, the copolymers, terpolymers and the like can be comprised of, in part, the following unit:

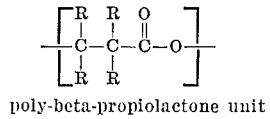

a poly-beta-propiolactone unit

Hence, while the linear homopolymers can be prepared from cyclic esters which contain 6, 7 or 8 atoms in the cyclic ester nucleus, at least one of the cyclic esters utilized in the preparation of the copolymers can contain 4 atoms in the cyclic ester nucleus. Thus, for example, the plasticizers employed in the instant invention can be homopolymers of the delta-valerolactones, epsilon-caprolactones, zeta-enantholactones, 4-keto-m-dioxanes, and the 3-oxa-6-hydroxyhexanoic acid lactones; or copolymers, of beta-propiolactones with, for example, epsilon-caprolactone, or copolymers of any of the aforesaid lactones containing 6, 7 or 8 atoms in the chain of the cyclic ester nucleus.

These linear copolymers are further characterized by a reduced viscosity value in the range of from about 0.8 to about 7.0, and higher: preferably from about 1.0 to about 5.0, and still more preferably from about 1.2 to about 4.0, as determined at a concentration of 0.4 gram of said copolymer per 100 milliliters of chloroform at 30° C. It is pointed out that the term "copolymer" is used in its generic sense to include the polymeric products which result from the copolymerization reaction of two or more copolymerizable monomers, said monomers entering into the copolymerization reaction in significant quantities.

These polymers are further characterized by the following recurring structural linear Unit IA:

(IA) 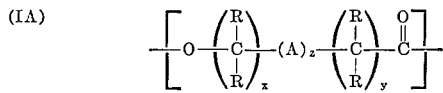

wherein each R, individually, is selected from the class consisting of hydrogen, alkyl, halo and alkoxy; A is the oxy group; $x$ is an integer from 1 to 4; $y$ is an integer from 1 to 4; $z$ is an integer of zero or one; with the provisos that (a) the sum of $x+y+z$ is at least 4 and not greater than 7, and (b) the total number of R variables which are substituents other than hydrogen does not exceed 3, preferably does not exceed 2, per unit. Illustrative R variables include those listed above for R in Formula I and also hexyl, chloro, bromo, iodo, and the like. It is preferred that in Unit IA each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the R substituents does not exceed twenty.

The aforedescribed recurring linear unit (I) or (IA) is interconnected through the oxy group (—O—) of the one unit with the carbonyl group

of a second unit. In different language, the interconnection of these units does not involve the direct bonding of two carbonyl groups, i.e.,

With relation to the relatively high molecular weight cyclic ester polymers, the treminal moieties thereof are not determinable by infra-red analysis which factor is readily understandable since macromolecules are involved. On the other hand, the relatively lower molecular weight cyclic ester polymers, e.g., those having reduced viscosity values below about 0.25 are characterized by end groups which can be hydroxyl; carboxyl, hydrocarbyl such as, alkyl, cycloalkyl, aryl, aralkyl, and alkaryl; hydrocarbyloxy, such as, alkoxy, cycloalkoxy, aryloxy, aralkoxy, and alkaryloxy; and possibly other moieties such as catalyst residue; and mixtures of the foregoing. It may be desirable in certain instances that the hydroxyl and carboxyl end groups, if present, be esterified or acylated to render them inert such as by reacting the hydroxyl moiety with a monocarboxyl compound or its corresponding anhydride, e.g., acetic acid, acetic anhydride, butyric acid, 2-ethylhexanoic acid, benzoic acid, etc., or by reacting the carboxyl moiety with a monohydroxyl compound such as monohydric alcohol or monohydric phenol, e.g., methanol, 2-ethylhexanol, isobutanol, phenol, and the like.

Particularly preferred polymers of cyclic esters under

Formula (IA) are those which are characterized by the oxypentamethylenecarbonyl chain as seen in recurring structural Unit (IB):

(IB)
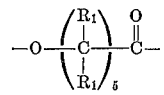

wherein each $R_1$ is hydrogen or lower alkyl, preferably hydrogen or methyl, with the proviso that no more than three $R_1$ variables are substituents other than hydrogen.

In summary, therefore, the high molecular weight linear polymers which are encompassed within the scope of the recurring structural unit shown in Formula (I) supra and which are employed as a plasticizing agent in the invention include the homopolymers of the unsubstituted and substituted lactones and oxalactones, i.e., the delta-valerolactones, the oxa-delta-valerolactones, the epsilon-caprolactones, the oxa-epsilon-caprolactones, the zeta-enantholactones, and the oxa-zeta-enantholactones; and the polymers obtained by reacting an admixture of at least two of the above-enumerated lactones and/or oxalactones, or an admixture of at least one of the aforesaid lactones or oxalactones with a beta-propiolactone.

The novel linear polymers which are particularly suitable as plasticizing agents include, among others, those copolymers which contain two or more of the following cyclic esters polymerized therein, namely, beta-propiolactone, delta-valerolactone, epsilon-caprolactone, the alkyl-beta-propiolactones, the alkyl-epsilon-caprolactones, the mixed alkyl-epsilon-caprolactones, the ketodioxanes, alkyl-ketodioxanes and alkoxy-ketodioxanes. It has been observed that an outstanding and vastly superior combination of properties in the novel plasticized polymer compositions are obtained when employing the copolymers of epsilon-caprolactone and epsilon-caprolactones which have from 1 to 3 lower alkyl substituents and other copolymers of epsilon-caprolactone which have from 1 to 3 lower alkyl substituents. Particularly preferred plasticizers include, for example, epsilon-caprolactone/methyl-epsilon-caprolactone copolymer; epsilon-caprolactone/dimethyl-epsilon-caprolactone copolymer; epsilon-caprolactone/trimethyl-epsilon-caprolactone copolymer; epsilon-caprolactone/ethyl-epsilon-caprolactone copolymer; epsilon-caprolactone/diethyl - epsilon - caprolactone copolymer; epsilon - caprolactone/triethyl - epsilon-caprolactone copolymer; epsilon - caprolactone/propyl-epsilon-caprolactone copolymer; epsilon - caprolactone/dipropyl-epsilon-caprolactone copolymer; epsilon-caprolactone/tripropyl-epsilon-caprolactone copolymer; the copolymers of alkyl-delta-valerolactone or delta-valerolactone with the above illustrated lower alkyl-epsilon-caprolactones, for example, epsilon-caprolactone/trimethylvalerolactone; the mixed monomethyl-, diethyl-, and/or trimethyl-epsilon-caprolactone copolymers; the mixed monoethyl-, diethyl, and/or triethyl-epsilon-caprolactone copolymers, epsilon-caprolactone/2-keto-1,4-dioxane copolymer; epsilon-caprolactone/n-propyl - 2 - keto - 1,4 - dioxane copolymer; epsilon-caprolactone alpha, alpha-dimethyl-beta-propiolactone copolymer; and the like.

Also preferred as plasticizers are polymers containing three and four of the aforementioned esters polymerized therein, such as for example, epsilon-caprolactone/methyl-epsilon-caprolactone/2 - keto - 1,4 - dioxane terpolymer; epsilon - caprolactone/diethyl - epsilon-caprolactone/2-keto - 1,4 - dioxane terpolymer; epsilon-caprolactone/diethyl - epsilon-caprolactone/dipropyl-epsilon-caprolactone terpolymer; epsilon-caprolactone/diethyl-epsilon-caprolactone/dipropyl-epsilon-caprolactone/2 - keto - 1,4-dioxane terpolymer and the like.

It is pointed out that the term "alkyl substituted lactones," for example, methyl-epsilon-caprolactone, as used throughout the specification and claims refers to a lactone in which the alkyl substituent can be attached to the same carbon atom in the lactone ring, e.g., beta, gamma, or delta, etc., positions, and also, to a lactone in which the alkyl substituent can be attached to different carbon atoms in the lactone ring, e.g., beta, gamma, and delta, etc., positions, to give, in effect, an isomeric mixture of alkyl substituted lactones. In addition, the alkyl substituted lactones in this specification and claims can contain one ore more alkyl substituents, which can be the same or different, on the lactone ring. The term "lower alkyl" refers to a monovalent saturated aliphatic hydrocarbon radical which contains from 1 to 4 carbon atoms. The proportions of comonomers contained, in polymerized form, in the linear copolymer which is used as the plasticizing agent can vary over the entire range.

The particularly preferred plasticizers which can be employed in the practice of the instant invention are the solid copolyesters prepared from about 60 to about 85 parts by weight of epsilon-caprolactone, and from about 40 to about 15 parts by weight of a second lactone, particularly the mixed beta-, gamma-, delta-methyl-epsilon-caprolactones, and which have a reduced viscosity of from about 0.8 to about 7.0, and higher. The more highly preferred plasticizers are those prepared from about 75 to about 85 parts by weight of epsilon-caprolactone, and from about 25 to about 15 parts by weight of mixed beta-, gamma-, delta-methyl-epsilon-caprolactones, and which have a reduced viscosity of from about 1.0 to about 5.0, and still more preferably from about 1.2 to about 4.0. These copolymers can be considered as the ultimate in imparting outstanding and superior characteristics and properties to the polymer compositions.

Whenever it is desirable to employ a heat stabilizer in conjunction with poly(vinyl halide) compositions, such as, for example, those of the cadmium-barium type, the use of tin compounds as heat stabilizers is less preferred inasmuch as they have been known to degrade polyesters.

The plasticizers which are contemplated in the invention can be prepared by polymerizing a cyclic ester in the presence of an organometallic catalyst as will be described hereinafter in detail. The cyclic esters can be represented by the following structural formula:

(II)
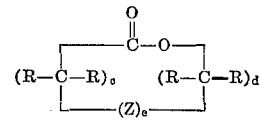

wherein each R, individually, can be hydrogen, alkyl, alkoxy, and alkoxyalkyl; wherein subscripts $c$ and $d$, individually, are integers which have a value greater than zero and less than 4; wherein the sum of $c$ plus $d$ is a whole number greater than 1 and less than 6, preferably greater than 2 and less than 5; wherein $e$ has a value of zero or 1; and wherein Z is an oxy group i.e., —O— group, or the unit

the R variables of said unit having the same values as above; with the proviso that (a) no more than three R variables attached to the carbon atoms contained in the cyclic ester ring are groups other than hydrogen and (b) when $e$ is one the sum of $c$ plus $d$ is greater than 2, and can be as high as 6.

The cyclic esters which are encompassed within the scope of Formula II supra include, by way of illustrations, beta-propiolactone; delta-valerolactone; the monoalkyl-delta-valerolactones, e.g., the monomethyl-, monethyl-monoisopropyl-, mono-n-butyl-, mono-n-hexyl-, mono-n-decyl, and monododecyl-delta-valerolactones, and the like; the dialkyl-delta-valerolactones in which the two alkyl groups are substituted on the same or different carbon atoms in the cyclic ester ring, e.g., the dimethyl-, diethyl-, diisopropyl-, dipentyl-, and di-n-octyl-delta-valerlactones, and the like; the trialkyl-delta-valerolactones, e.g., the trimethyl-, triethyl-, triisopropyl-, triisobutyl-, trihexyl-, and trioctyl-delta-valerolactones, and the like; epsilon-caprolactone; the monoalkyl-, dialkyl-, and trialkyl-epsilon-caprolactones, e.g., the monomethyl-, monoethyl-, monoisopropyl-, monohexyl-, mono-n-octyl-, dimethyl-, diethyl-, dipropyl-, dipentyl-, dioctyl-, trimethyl-, triethyl-, tri-n-propyl-, tri-t-butyl-, and tri-n-hexyl-epsilon-caprolactones, and the like; the monoalkoxy- and dialkoxy-delta-valerolactones and epsilon-caprolactones, e.g., monomethoxy-, monoethoxy-, monoisopropxy-, mon-sec-butoxy-, dimethoxy, diethoxy-, diisopropoxy-, di-ni-butoxy-delta-valerolactones and epsilon-caprolactones, and the like; the monoalkoxyalkyl-, dialkoxyalkyl-, and trialkoxyalkyl-delta-valerolactones and epsilon-caprolactones, e.g., the monomethoxyethyl-, monoethoxyethyl-, dimethoxyethyl-, diethoxypropyl, trimethoxyethyl-, and trimethoxy-propyl-delta-valerolactones and epsilon- caprolactones, and the like; zeta-enantholactone; alkyl-zeta-enanthaolactone; alkoxy-zeta-enantholactone, eta-caprylolactone, the oxa-5-hydroxypentanoic acid lactones, the oxa-6-hydroxyhexanoic acid lactones, and the oxa-7-hydroxyheptanoic acid lactones wherein the oxa group (—O—) is at least one carbon atom removed from the ester group

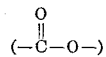

in the lactone ring, e.g., 2-keto-1,4-dioxane, dimethyl-2-ketone-1,4-dioxane, alkyl-2-keto-1,4-dioxane, n-propyl-2-keto-1,4-dioxane, alkoxy-2-keto-1,4-dioxane, ethoxy-2-keto-1,4-dioxane and the like.

The organometallics which are contemplated as catalysts in the polymerization of the cyclic ester(s) can be characterized by the following formula:

(III)
$$MR'$$

wherein M represents a Group I-A metal in the Periodic Table, for example, lithium, sodium, potassium, rubidium, or cesium; and wherein R' represents a monovalent hydrocarbon radical.

The monovalent hydrocarbon radicals are of any type including aliphatic, aromatic, and alicyclic radicals as exemplified by alkyl, alkenyl, cycloalkyl, cycloalkenyl, aryl, alkaryl, aralkyl, alkynyl (excluding terminal acetyleneically unsaturated alkynylalkyls), and the like. More specifically illustrative hydrocarbon radicals include, for instance, methyl, ethyl, isopropyl, n-propyl, n-butyl, t-butyl, isobutyl, sec-butyl, amyl, hexyl, isohexyl, 2-ethylhexyl, 3-methylheptyl, the octyls, the decyls, the dodecyls, the octadecyls, cyclopentyl, cyclohexyl, cycloheptyl, 2-methylcyclophentyl, 2-butylcyclohexyl, 3-methylcycloheptyl, vinyl, propenyl, allyl, 3-butenyl, the cyclopentenyls, the cyclohexenyls, the cyclohetenyls, the alkylcyclohexenyls, phenyl, benzyl, ortho-, meta-, and par-tolyl, the xylyls, butylphenyl, phenethyl, phenylpropyl, phenylbutyl, ethynyl, 1-butynyl, 2-butylnyl, cinnamyl, naphthyl, trimethylphenyl, 9-fluoroenyl, and the like.

Illustrative classes of organometallic catalysts which can be employed include, for example, alkylsodium, alkyllithium, alkylpotassium, arylsodium, aryllithium, arylpotassium, cycloalkylsodium, cycloalkylpotassium, the alkali metal naphthalenes, and the like. The alkylmetals and arylmetals are preferred. Specific examples of the organometallic catalysts include, among others, methylsodium, ethylsodium, n-propylsodium, n-butylsodium, 2-ethylhexylsodium, ethylpotassium, isopropylpotassium, n-butylpotassium, n-dodecylpotassium, phenyl-lithium, phenylsodium, phenylpotassium 2-tolylsodium, 3-tolylsodium, 2-meta-xylylsodium, benzyllithium, phenylpropylpotassium, 9-fluoroenylpotassium, sodium naphthalene, potassium naphthalene, lithium naphthalene, vinylsodium, propenyllithium, 3-butenyllithium, 2-butenylpotassium, allylsodium, and the like.

The catalysts are employed in catalytically significant quantities. In general, a catalyst concentration in the range of from about 0.001, and lower, to about 10, and higher, weight percent based on the weight of total monomeric feed, is suitable. A catalyst concentration in the range of from about 0.01 to aobut 3.0 weight percent is preferred. A catalyst concentration in the range of from about 0.05 to about 1.0 weight percent is highly preferred. For optimum results, the particular catalyst employed, the nature of the monomeric reagent(s), the operative conditions under which the polymerization reaction is conducted, and other factors will largely determine the desired catalyst concentration.

The polymerization reaction can be conducted over a wide temperature range. Depending upon various factors such as the nature of the monomeric reagent(s) employed, the particular catalyst employed, the concentration of the catalyst, and the like, the reaction temperature can be as low as —40° C., and lower, and as high as +250° C., and higher. A suitable temperature range is from about —10° C. to about 225° C. A reaction temperature in the range of from about 0° C. to about 200° C. is preferred.

The polymerization reaction preferably occurs in the liquid phase, and to this extent sufficient pressure is employed to maintain an essentially liquid reaction mixture regardless whether or not an inert normally-liquid organic vehicle is employed. Preferably, the polymerization reaction is conducted under an inert atmosphere, e.g., nitrogen, butane, helium, etc., The ultimate molecular weight of the resulting polymer will depend, to an extent, upon various factors such as the temperature, the choice and concentration of the catalyst, the use and amount of an inert normally-liquid organic vehicle(s), and the like.

In general, the reaction time will vary depending on the operative temperature, the nature of the monomeric cyclic esters employed, the particular catalyst and the concentration employed, the use of an inert normally-liquid organic vehicle, and other factors. The reaction time can vary from several seconds to several hours, or more, depending on the variables illustrated above.

It is preferred to conduct the polymerization reaction in the essential absence of impurities which contain active hydrogen sine the presence of such impurities tends to deactivate the catalyst and/or increase the induction period. The minimization or essential avoidance of impurities such as water, carbon dioxide, aldehydes, ketones, etc., is highly desirable. It is also preferred that the polymerization reaction be conducted under substantially anhydrous conditions.

When polymerizing an admixture containing at least two different cyclic esters, the proportions of said cyclic esters can vary over the entire range. However, the preferred concentration of each monomeric cyclic ester is in the range of from about 15 to about 85 weight percent, based on the total weight of said cyclic esters.

The polymers can be prepared via the bulk polymerization, suspension polymerization, or the solution polymeripation routes. The polymerization reaction can be carried out in the presence of an inert normally-liquid organic vehicle such as, for example, aromatic hydrocarbons, e.g., benzene, toluene, xylene, ethylbenzene, and the like; various oxyenated organic compounds such as anisole, the dimethyl and diethyl ethers of ethylene glycol, of propylene glycol, of diethylene glycol and the like; normally-liquid saturated hydrocarbons including the open chain, cyclic, and alkyl-substituted cyclic saturated hydrocarbons such as hexene, heptane, various normally-liquid petroleum hydrocarbon fractions, cyclohexene, the alkylcyclohexenes, decahydronaphthalene, and the like. If desired, a mixture of mutually miscible inert normally-liquid organic vehicles can be employed.

The polymerization process can be executed in a batch, semi-continuous, or continuous fashion. The reaction vessel can be a glass vessel, steel autoclave, elongated metallic tube, or other equipment and material employed in the polymer art. The order of addition of catalyst and monomeric reagent(s) does not appear to be critical. A suitable procedure is to add the catalyst to the reaction zone containing the monomeric reagent(s) and inert organic vehicle, if any. If desired, the catalyst can be in solution or suspension (in an inert normally-liquid organic vehicle). Incremental addition of catalyst to the reaction zone can be employed. If desired, the above procedure can be reversed, that is, the monomeric reagent(s) per se or as a solution or suspension in an inert organic vehicle can be added to the reaction zone containing the catalyst (or a catalyst solution or suspension). Also, the catalyst, reagent(s), and inert organic vehicle, if any, can be added to the reaction zone simultaneously. The reaction zone (be it a closed vessel or an enlogated tube) can be fitted with an external heat exchanger to thus control undue temperature fluctuations, or to prevent any possible "run-away" reaction temperatures due to the exothermic nature of the reaction. In a continuous operation employing as the reaction zone an elongated tube or conduit, the use of one or a plurality of separate heat exchangers can be conveniently used. In a batch operation, stirring means can be provided for agitating the reaction mixture, as desired.

Unreacted monomeric reagent oftentimes can be recovered from the reaction product by conventional techniques such as by heating said reaction product under reduced pressure. Removal of unreacted monomeric reagent(s) and/or inert organic vehicle can be accomplished by mechanical means such as treatment of the reaction product in a Marshall Mill and the like. The polymer product also can be recovered from the reaction product by washing said reaction product with an inert normally-liquid organic vehicle, e.g., heptane, and subsequently drying same under reduced pressure at slightly elevated temperatures. Another route involves dissolution in a first inert organic vehicle, followed by the addition of a second inert organic vehicle which is miscible with the first vehicle but which is a non-solvent for the polymer product, thus precipitating the polymer product. If desired, the reaction product can be dissolved in an inert organic vehicle such as acetone, and the like, followed by the addition of sufficient water to the resulting solution, said water being miscible with said inert organic vehicle but being a non-solvent for the water-insoluble polymer thereby precipitating the polymer product. Recovery of the precipitated polymer can be effected by filtration, decantation, etc., followed by drying same as indicated previously. If desired, the polymer product also can be freed of catalysts residue, if any, by extraction with dilute mineral acid such as hydrochloric acid or sulfuric acid.

In the absence of added functional initiator, the polymerization process can be desirably effected under the operative conditions and in the presence of anionic catalysts as specifically noted above and in U.S. Patent Nos. 3,021,309 to 3,021,317 which specifies such catalysts as dialkylzinc, dialkylmagnesium, dialkylcadmium, trialkylaluminum, dialkylaluminum alkoxide, alkylaluminum dialkoxide, dialkylaluminum halide, aluminum trialkoxide, alkyllithium, and aryllithium. Specific anionic catalysts would include d-n-butylzinc, diethylmagnesium, di-n-butylcadmium, triethylaluminum, triisobutylaluminum, tri-2-ethylhexylaluminum, aluminum triisopropoxide, aluminum triethoxide, ethyllithium, n-butyllithium, and the like.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Benzene and chloroform are frequently used as solvents although toluene, cyclohexanone, or other organic solvent for the cyclic ester polymers can be used.

The cyclic ester polymers used herein are structurally polyesters and the term "polyester" is also used herein to designate the cyclic ester polymers hereinabove described in regard to Formulas I and IA.

The cyclic ester polymer can be fluxed on a mill and sheeted off to form sheets or films. It can be extruded as a tape, film, rope, or other shape or can be extruded and pelletized. When formed by the dispersion polymerization technique, the cyclic ester polymer is obtained in powder or granular form. It can also be dissolved in a suitable solvent, such as, benzene, toluene, 2-nitropropane, methylene chloride and other solvents. Methylene chloride and other fast drying solvents are preferred when the cyclic ester is used as a solution. The cyclic ester polymer can be employed in this invention in any of the above forms, although it is usually preferred to employ it in the form of powders, granules or pellets.

The resins which can be satisfactorily plasticized by the polyesters hereinbefore disclosed can be any thermoplastic vinyl polymer having recurring units which contain at least one chemically bonded member of the class consisting of aryl, e.g., phenyl, ethylphenyl, methylphenyl and the like, oxygen, sulfur, nitrogen or halogen, e.g., chlorine and fluorine. The term "thermoplastic vinyl polymer" as used herein means a polymeric compound prepared from monomers containing the vinyl or vinylidene group:

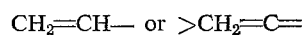

as well as mixtures of said monomers to produce homopolymers, copolymers, terpolymers, and the like. The vinyl group is bonded to one, and the vinylidene group is bonded to one or if desired two, groups which are, or contain aryl, as in styrene, ethylvinylbenzene, chlorostyrene, methylstyrene and the like; oxygen, as in acrylic acid and its derivatives, vinyl esters, vinyl ketones and the like as listed below; sulfur, as in the vinyl sulfones, thioethers, sulfoxides, sulfonates and the like as listed below, nitrogen, as in the vinyl nitriles, amides, pyridines, pyrollidones, carbazoles and the like as listed below; or halogen as in vinyl chloride, vinylidene chloride, vinyl fluoride, vinylidene fluoride and the like.

For simplication, the term "polymer" as used in reference to the resins includes the homopolymers as well as the normally solid, thermoplastic polymers produced by the interpolymerization of two or more polymerizable monomers which contain a polymerizable vinyl or vinylidene group; and the term "polymerization" includes the polymerization of a single monomer to produce a homopolymer as well as the polymerization of a mixture of two or more monomers to produce copolymers, terpolymers, etc. Illustrative of the monomers which can be polymerized to high molecular weight polymers suitable as thermoplastic vinyl polymers herein are acrylic acid and its derivatives, such as, acrylonitrile, methacrylonitrile, acrylamide, methacrylamide, methacrylic acid, methyl methacrylate, ethyl methacrylate, ethyl acrylate, and the like; the vinyl halides, such as, vinyl chloride, vinylidene chloride, and the like; the normally solid vinyl ethers, such as, vinylbutyl ether, vinylethyl ether and the like; the vinyl esters, such as, vinyl acetate, vinyl butyrate, vinyl benzoate, and the like; the vinyl ketones, such as, isopropenyl methyl ketone, vinyl phenyl ketone, vinyl methyl ketone, alpha-chlorovinyl methyl ketone, and the like; the vinyl thioethers, such as, vinyl ethyl sulfide, vinyl p-tolyl sulfide, divinyl sulfide, and the like. Other monomers or monomer mixtures which are capable of polymerization are styrene, divinyl sulfone, vinyl ethyl sulfone, vinyl ethyl sulfoxide, vinyl sulfonic acid, sodium vinyl sulfonate, vinyl sulfonamide, vinyl pyridine, N-vinyl pyrollidone, N-vinyl carbazole, and the like. It will be and is obvious to a person skilled in the art that the concentrations of the monomers in the polymerizable mixture can be varied from a mixture consisting entirely of one monomer to mixtures consisting of two or more monomers in which the concentration of each monomer can be varied to suit the individual's purpose.

Other suitable polymers are polyacrylonitrile, poly(vinyl chloride), poly(vinyl formal), poly(vinyl acetal), poly(vinyl butyral), poly(vinyl acetate), hydrolyzed poly(vinyl acetate), poly(vinylidene chloride), poly(methyl methacrylate), polystyrene, impact resistant polystyrene, poly(ethyl acrylate), polyacrylic acid, poly(isopropenyl methyl ketone), acrylonitrile/vinylidene chloride copolymer, vinyl chloride/vinyl acetate copolymer, acrylonitrile/vinyl chloride copolymer, acrylonitrile/vinylacetate copolymer, styrene/methyl methacrylate copolymer, vinyl chloride/vinylidene chloride copolymer, styrene/acrylonitrile copolymer, acrylonitrile/butadiene/styrene terpolymer, blends of poly(vinyl chloride) and acrylonitrile/butadiene/styrene terpolymer, acrylonitrile/vinyl chloride/vinylidene chloride terpolymer, and the like.

In general, any one of several methods of mixing and fluxing can be utilized in the preparation of the plasticized compositions of this invention. For instance, the resin and plasticizer can be intimately dispersed by stirring or tumbling and the admixture fluxed into a continuous sheet on a steam heated roll mill. Other methods of mixing and fluxing, such as a Banbury cycle followed by calendering can also be employed.

In practice, the polyester will be employed in a plasticizing amount. By the term "plasticizing amount" is meant that quantity of polyester which will appreciably increase the flexibility, workability or distensibility of the material with which it is admixed. The preferred concentration of polyester plasticizer in the resin is within the range of from about 25 to about 125 parts per 100 parts of resin, although concentration above and below the aforesaid range can be employed. Thus, as little as one part of the polyester plasticizers to 100 parts of the resin has a measurable effect on the stiffness of the mixture while the upper limit would be determined by the degree of flexibility that the end use might require. The thermoplastic vinyl polymer component therefore can be present in amounts of about 5 to about 99 percent and the cyclic ester polymer plasticizer can be present in amounts of about 95 to about 1 percent, the percentages being based on the total weight of the thermoplastic vinyl polymer and cyclic ester polymer.

As plasticizers, the aforesaid novel polymers impart outstanding and unexpected properties and characteristics to vinyl resins, particularly vinyl halide resins. The incorporation of the novel polymers into vinyl resins results in a plasticized composition which has extraordinarily low brittle temperatures in the range of −40° C. to −50° C., and lower. The novel plasticized polymeric compositions of this invention have the remarkable ability to resist shattering at low temperatures and in this respect they are markedly superior to similar compositions plasticized with commercial polyesters. In addition, the plasticized compositions exhibit very low volatility and extremely high resistance to oil and water extraction. Moreover, films prepared from the vinyl resins which are plasticized with the novel polymers are tougher and more extensible than films prepared from the same vinyl resins which are plasticized with conventional plasticizers, e.g., dioctyl phthalate, or the corresponding low molecular weight polyester. It should be borne in mind that the above enumerated unexpected and unobvious results which are achieved by virtue of the employment of the novel polyesters in various fields of applications are also manifest when compared to the use of the corresponding relative low molecular weight polyester in the same fields of applications under substantially similar conditions.

Due to their excellent compatibility the polyesters can be employed as plasticizers in vinyl applications which demand good low-temperature performance. Their low volatility enables vinyls to maintain their properties over extended periods of time. Moreover, the plasticizers provide a marked improvement in the drape, softness and hand of vinyl films, sheeting and other fabrics. Additionally, the low degree of oil and water extraction and non-migratory characteristics render these plasticizers useful in coated fabrics for automobile upholstery, vinyl outerwear, vinyl foams, insulating medium for wire and cable, and other vinyl products.

In the following examples, various high molecular weight polyesters were evaluated as plasticizers for vinyl resins. In reporting the physical properties of the plasticized vinyl resin compositions certain symbols and abbreviations are employed. These symbols and abbreviations (and various tests) are defined as follows:

(1) A.S.T.M.=American Society of Testing Materials.

(2) $T_f$ and $T_4$=temperatures at which torsional stiffnes moduli are 135,000 and 10,000 p.s.i., respectively, as determined in accordance with A.S.T.M. Method D 1043–51.

(3) $T_B$ (brittle temperature)=low temperature impact measurement as determined in accordance with A.S.T.M. Method D 746–55T.

(4) Volatility determined in accordance with A.S.T.M. Method D 1203–55 (test temperature of 70° C.).

(5) Oil extraction (test temperature of 50° C.) determined in accordance with the formula:

$$E_1 = \frac{100(W_1 - W_2)}{W_2}$$

wherein $E_1$ is the weight percent extraction of plasticizer, wherein $W_1$ is the original weight of the plasticized sample, and wherein $W_2$ is the final weight of the plasticized sample after subjecting sample to mineral oil extraction test for a period of time, followed by drying in a circulating air oven at 70° C. for 30 minutes.

(6) Water Extraction (test temperature of 70° C.) determined in accordance with the formula:

$$E_w = \left(\frac{100(W_1 - W_2)}{W_1}\right)\left(\frac{t \text{ (actual)}}{0.004}\right)$$

wherein $E_w$ is the weight percent extraction of plasticizer, wherein $W_1$ is the original weight of the plasticizer sample, wherein $W_2$ is the final weight of the plasticized sample after subjecting sample to water extraction test for a period of time, followed by drying in a circulating air oven at 70° C. for 30 minutes, wherein $t$(actual) is the actual thickness of the sample, and wherein 0.004 is a factor to adjust the thickness of the sample to the standard 4 mils.

(7) $I_R$=reduced viscosity value of plasticizer or vinyl resin material in 100 milliliters of a given solvent at given temperature. The reduced viscosity values of the polyester plasticizers were determined at a concentration of either 0.2 gram or 0.4 gram of the polyester per 100 milliliter of chloroform at 30° C. (or with the indicated solvent). The reduced viscosity of the poly(vinyl chlorides), unless otherwise indicated, were determined at a concentration of 0.2 gram per 100 milliliters of cyclohexanone at 20° C.

(8) Stiffness Modulus=the secant tensile modulus at one percent elongation as determined on an Instron tensile tester at 25° C.

(9) Tensile, Elongation, and Elongation Modulus were determined on a Scott L–6 tensile tester operating at a constant rate of elongation of 4 feet per minute. These tests were performed at 23° C.

(10) Durometer A hardness determined in accordance with A.S.T.M. Method D 676–49T.

The following examples illustrate the present invention:

EXAMPLE 1

The use of minor concentrations of poly(epsilon-caprolactone), having a reduced viscosoity of at least 0.8, as a plasticizer for poly(vinyl chloride) was demonstrated by blending this polyester with poly(vinyl chloride), which had a reduced viscosity of 0.75, in a respective weight ratio of 10:90. The blend milled much easier on a two-roll mill at 165° C., and the roll bank at the "bite" was much more fluid than was the case when unmodified poly(vinyl chloride) was milled under the same conditions.

EXAMPLE 2

Equal parts by weight of poly(vinyl chloride) having a reduced viscosity of 0.75, and a solid, high-molecular weight copolyester having a reduced viscosity of at least 0.8 and comprised of epsilon-caprolactone and mixed methyl-epsilon-caprolactone in a respective ratio of 80:20, were milled together with a conventional heat stabilizer for 5 minutes at temperatures ranging from 165° C. initially, down to 100° C. at the end of the milling. There was obtained a flexible, clear sheet which had an Instron stiffness modulus of only 500 pounds per square inch at room temperature, compared to a value of 258,500 pound per square inch for the unmodified poly(vinyl chloride). This degree of flexibility is more than is needed for familiar plasticized poly(vinyl chloride) articles such as shower curtains, upholstery, and the like.

properties of a similar poly(vinyl chloride) composition plasticized with a liquid commercial polyester plasticizer.

The volatile losses as determined by A.S.T.M. Method D 1203–55 were negligible at 70° C. (i.e. much less than 1 percent) with the compositions plasticized with the caprolactone-mixed-methylcaprolactones polyesters. Extraction losses in mineral oil at 50° C. and in water at 70° C. were of low order (i.e. less than two percent in oil and less than one percent in water).

It should be noted that in some instances crystallinity may be encountered in the lactone or oxalactone polymers and copolymers. The minimization or elimination of this crystallinity characteristic can be achieved, as is oftentimes desired, by choosing a comonomer which contains pendant groups as illustrated by alkyl groups, for example, methyl, ethyl and the like. Thus, it is highly preferred that a lower alkyl-substituted cyclic ester be employed with the unsubstituted cyclic ester to essentially eliminate or minimize the crystallinity characteristics of the lactone polyester. The resulting polyester thus would be characterized by the presence of these pendant alkyl groups along the substantial linear polyester chain. Hence, as indicated in these examples, mixed methylcaprolactones were copolymerized with epsilon-caprolactone to form the polyester plasticizer.

TABLE I.—EVALUATION OF SOLID CAPROLACTONE-METHYLCAPROLACTONE POLYESTERS AS PLASTICIZERS FOR POLY(VINYL CHLORIDE)

| Example | Polyester charging ratio, weight percent | | Wt. percent of polyester in resin | Physical properties of plasticized composition [1] | | | |
|---|---|---|---|---|---|---|---|
| | Caprolactone | Methylcaprolactones | | Tensile, p.s.i.[2] | Elong., percent [2] | Stiff mod., p.s.i.[3] | $T_B$,[4] ° C. |
| 3 | 100 | 0 | 45 | 2,100 | 350 | 1,238 | −46 |
| 4 | 80 | 20 | 45 | 2,100 | 500 | 810 | −64 |
| 5 | 70 | 30 | 45 | 1,900 | 620 | 820 | −60 |
| 6 | 60 | 40 | 45 | 1,925 | 390 | 772 | −52 |
| 7 | 0 | 100 | 45 | 2,050 | 310 | 1,008 | −20 |
| 8 | Commercial liquid polyester [5] | | 45 | 2,000 | 345 | 740 | −10 |

[1] Compositions were stabilized with 0.5 percent of dibutyltin maleate.
[2] Tensile and elongation were determined on a Scott L-6 tensile tester operating at a constant rate of elongation of four feet per minute. Tests were run at 23° C.
[3] Stiffness modulus: secant tensile modulus at one percent elongation as determined on an Instron tensile tester at 25° C.
[4] $T_B$: brittle temperature as determined by A.S.T.M. Method D 746–55T.
[5] 2-ethyl-1,3-hexanediol adipate acetate polyester.

EXAMPLES 3–8

In the following examples, the polyester plasticizers, prepared from the indicated ratio of epsilon-caprolactone to mixed methyl-caprolactones, were fluxed with poly(vinyl chloride), which had a reduced viscosity of 0.9, on a two-roll mill at temperatures of about 158° C. The transparent, flexible sheets obtained by this procedure were then molded at 158° C. to obtain specimens suitable for testing. The data summarized in Table I below demonstrate that the plasticized compositions possess an attractive combination of low temperature impact strength ($T_B$), flexibility (low stiffness modulus), and good mechanical strength. For comparison purposes, Example 8 shows the

EXAMPLES 9–11

In a similar manner to that set forth in Examples 3–8 solid polyesters of epsilon-caprolactone and delta-valerolactone having reduced viscosities of at least 0.8 were evaluated as plasticizers for poly(vinyl chloride) which had a reduced viscosity of 0.9. The data are summarized in Table II below:

TABLE II.—EVALUATION OF EPSILON-CAPROLACTONE/DELTA-VALEROLACTONE POLYESTERS AS PLASTICIZERS FOR POLY(VINYL CHLORIDE)

| Example | Polyester charging ratio, weight percent | | Wt. percent of polyester in resin | Physical properties of plasticized composition [1] | | | |
|---|---|---|---|---|---|---|---|
| | Caprolactone | Valerolactone | | Tensile, p.s.i. | Elong., percent | Stiff mod., p.s.i. | $T_B$, ° C. |
| 9 | 80 | 20 | 45 | 1,430 | 230 | 687 | −26 |
| 10 | 70 | 30 | 45 | 1,590 | 230 | 758 | −25 |
| 11 | 60 | 40 | 45 | 1,460 | 235 | 686 | −26 |

EXAMPLES 12–14

In a manner similar to that set forth in Examples 9–11 solid polyesters of epsilon-caprolactone and 2-keto-1,4-dioxane having the indicated reduced viscosities were evaluated as plasticizers for poly(vinyl chloride) which had a reduced viscosity of 0.9. The data are summarized in Table III below:

TABLE III.—EVALUATION OF SOLID CARPOLACTONE-KETODIOXANE POLYESTERS AS PLASTICIZERS FOR POLY(VINYL CHLORIDE)

| Example | Polyester charging ratio, weight percent | | $I_R$ | Weight percent of polyester in resin [1] | $T_B$, °C. | Stiffness modulus, p.s.i. |
|---|---|---|---|---|---|---|
| | Caprolactone | Ketodioxane | | | | |
| 12 | 75 | 25 | 2.44 | 37.5 | −32 | 3,480 |
| 13 | 85 | 15 | 2.28 | 37.5 | −34 | 2,150 |
| 14 | 90 | 10 | 2.13 | 37.5 | −30 | 2,360 |

[1] The resin also contained 1.5 weight percent of a barium-cadmium laurate stabilize sold under the unregistered trademark VanStay-HT by R. T. Vanderbilt Co.

EXAMPLES 15–20

In order to demonstrate that the concentration of the polyester plasticizers in poly(vinyl chloride) can vary over a considerable range, the following examples were prepared and evaluated for heat-distortion and flow index. The data presented in Table IV below clearly indicate the progressive losses in heat-distortion point and increases in flow index as the concentration of the plasticizer is increased.

TABLE IV.—PLASTICIZING ABILITY OF POLY(EPSILON-CAPROLACTONE) AT VARIOUS CONCENTRATIONS IN POLY(VINYL CHLORIDE)

| Concentration of polyester in resin | 0 | 1 | 5 | 10 | 20 | 40 |
|---|---|---|---|---|---|---|
| Heat-distortion point,[1] °C | 72 | 68 | 60 | 52 | 36 | <30 |
| Flow index,[2] milligram/min./ 190° C | 17.4 | 42.9 | 54 | 71 | 252 | 4,560 |

[1] A.S.T.M. Method D 648–45T, 264 p.s.i. fiber stress.
[2] As measured in the extrusion plastometer described in A.S.T.M. Method D 1238-52T. Conditions of this test (Bakelite Test Method WC 22-262-5A) were a measure of the extrudate in units of milligrams per minute at 190° C. under a load of 249 p.s.i.

TABLE VI.—EFFECT OF MOLECULAR WEIGHT OF POLYESTER ON $T_B$

| Example | Polyester composition, weight percent | | $I_R$ | Weight percent of polyester in resin | $T_B$, °C. |
|---|---|---|---|---|---|
| | Caprolactone | Mixed methyl-caprolactones | | | |
| 24 | 70 | 30 | 0.96 | 45 | −28 |
| 25 | 70 | 30 | 1.5 | 45 | −48 |
| 26 | 70 | 30 | 4.8 | 45 | −64 |

EXAMPLES 27—34

In order to demonstrate the unique combination of properties in vinyl halide resins which have been plasticized with the solid caprolacton-mixed methycaprolactone polyesters, a comparison was made with commercial plasticizers, as evidenced by the data in Table VII below:

TABLE VII.—COMPARISON OF COMMERCIAL PLASTICIZERS AND SOLID CAPROLACTONE-METHYLCAPROLACTONE COPOLYESTERS

| Example | Plasticizer | Molecular weight | Plasticizer concentration [1] | $T_B$, °C. | Oil extraction | Volatility |
|---|---|---|---|---|---|---|
| 27 | Di(2-ethylhexyl) adipate | 370 | 34.8 | −52 | 22.5 | 0.5 |
| 28 | Plastolein 9720 [2] | 850 | 41.4 | −24 | 3.8 | 1.6 |
| 29 | Flexol R 2H [3] | 1,900 | 46.4 | −11 | <1.0 | <1.0 |
| 30 | Paraplex G-25 [4] | 8,000 | 42.3 | −22 | <1.0 | <1.0 |
| 31 | Liquid caprolactone/methylcaprolactone copolyester | 1,900 | 41.0 | −22 | 1.4 | 1.1 |
| 32 | do | 2,000 | 41.0 | −26 | 1.4 | <1.0 |
| 33 | do | 5,300 | 40.7 | −27 | <1.0 | <1.0 |
| 34 | Solid caprolactone/methylcaprolactone copolyester | $I_R$=1.5 | 42.5 | −57 | <1.0 | <1.0 |

[1] Percent by weight of plasticizer in vinyl resin necessary to produce a flexible vinyl sheet having a tensile modulus of 1,000 p.s.i. at 100 percent elongation
[2] Emery Industries' liquid polyester.
[3] Union Carbide Corporation's liquid polyester of 1,3-hexanediol and adipic acid.
[4] Rohm and Haas' liquid polyester.

EXAMPLES 21–23

Poly(vinyl chloride) was blended with polyester plasticizers which had been prepared from epsilon-caprolactone and mixed methyl-caprolactones in varying proportions. As evidenced by the data in Table V below, the brittle temperature of the plasticized composition is markedly improved as the caprolactone concentration of the plasticizer increases:

TABLE V.—EFFECT OF POLYESTER COMPOSITION ON BRITTLE TEMPERATURE ($T_B$) OF POLY (VINYL CHLORIDE) RESIN

| Example | Polyester composition, weight percent | | $I_R$ | Weight percent of polyester in resin | $T_B$ °C. |
|---|---|---|---|---|---|
| | Caprolactone | Mixed methyl-caprolactones | | | |
| 21 | 60 | 40 | 0.83 | 45 | −20 |
| 22 | 70 | 30 | 0.88 | 45 | −38 |
| 23 | 80 | 20 | 0.90 | 45 | −46 |

EXAMPLES 24–26

Poly(vinyl chloride) was blended with polyester plasticizers which had been prepared from epsilon-caprolactone and mixed methylcaprolactones. As evidenced by the data in Table VI below, the brittle temperature of the plasticized compositions is markedly improved as the molecular weight of the polyester increases:

EXAMPLE 35

In order to demonstrate that the polyester plasticizers of this invention can be used in conjunction with other plasticizers for poly(vinyl chloride) to provide flexible compositions having improved physical properties, a composition was prepared and evaluated as indicated in Table VIII below:

TABLE VIII.—PHYSICAL PROPERTIES OF FLEXIBLE POLY(VINYL CHLORIDE) COMPOSITIONS CONTAINING MIXED PLASTICIZER SYSTEM

| Composition, parts by weight: | | |
|---|---|---|
| Poly(vinyl chloride)[1] | 54.5 | 54.5 |
| Polyester [2] | 45.0 | 22.5 |
| Flexol DOP [3] | | 22.5 |
| Dibutyltin maleate | 0.5 | 0.5 |
| Physical properties: | | |
| Tensile, p.s.i. | 1,900 | 1,725 |
| Elongation, percent | 350 | 375 |
| Instron stiffness modulus, p.s.i. | 779 | 589 |
| Durometer "A" hardness [4] | 62 | 58 |

[1] Reduced viscosity of 0.9.
[2] 80=10 copolyester of epsilon-caprolactone and mixed methyl-epsilon-caprolactones having a reduced viscosity of at least 0.8.
[3] Flexol DOP: di(2-ethylhexyl) phthalate.
[4] A.S.T.M. Method D–676–42T.

EXAMPLE 36

Poly(vinyl chloride) was mechanically mixed with 0.5 weight percent dibutyltin maleate and 45 weight percent poly-epsilon-caprolactone, both based on the weight of poly(vinyl chloride). The resulting mixture then was fluxed on a steam-heated, two-roll mill maintained at 158° C. The dibutyltin maleate served as a heat and light stabilizer. The poly-epsilon-caprolactone possessed an $I_R$ value of 1.1 and was prepared by polymerizing epsilon-caprolactone in the presence of dibutyl zinc catalyst. The plasticizer composition had the properties set out in Table IX below.

TABLE IX

| | |
|---|---|
| Milled, minutes/° C. | 5/158 |
| Tensile strength, p.s.i. | 2100 |
| Elongation, percent | 350 |
| Load at 100% elongation, p.s.i. | 1475 |
| Instron stiffness modulus, at 25° C., p.s.i. | 1238 |
| $T_f$, ° C. | −20 |
| $T_4$, ° C. | −46 |
| Extraction: | |
| Water, 24 hrs. at 70° C., percent | 0.3 |
| Oil, 50° C. | Slight |
| Volatile loss, percent in 24 hrs. at 70° C. | Nil |

EXAMPLE 37

Poly(vinyl chloride) was mechanically mixed with 0.5 weight percent dibutyltin maleate stabilizer and 45 weight percent 60 epsilon-caprolactone/40 isomeric mixture of methyl-epsilon-caprolactone copolymer, both based on the weight of said poly(vinyl chloride). The isomeric mixture of methyl-epsilon-caprolactone contained about 30 weight percent epsilon-methyl-, about 30 weight percent gamma-methyl-, and about 40 weight percent beta-methyl- and delta-methyl-epsilon-caprolactones. The copolymer possessed a reduced viscosity value of 0.9 (in benzene). The copolymer was prepared by conducting the polymerization reaction in the presence of dibutyl zinc. The resulting mixture then was fluxed on a steam-heated, two-roll mill maintained at 158° C. The plasticized composition had the properties set forth in Table X below.

TABLE X

| | |
|---|---|
| Milled, minutes/° C. | 5/158 |
| Tensile strength, p.s.i. | 1925 |
| Elongation, percent | 390 |
| Load at 100% elongation, p.s.i. | 975 |
| Instron stiffness modulus, at 25° C., p.s.i. | 772 |
| $T_f$, ° C. | −19 |
| $T_4$, ° C. | 0 |
| $T_B$, ° C. | −52 |
| Extraction: oil, 50° C. | Nil |

EXAMPLE 38

Poly(vinyl chloride) was mechanically mixed with 0.5 weight percent dibutyltin maleate stabilizer and 45 weight percent 80 epsilon-caprolacton/20 isomeric mixture of methyl-epsilon-caprolactone copolymer, both based on the weight of said poly(vinyl chloride). The isomeric mixture of methyl-epsilon-caprolactone contained about 30 weight percent epsilon-methyl-, about 30 weight percent gamma-methyl-, and about 40 weight percent beta-methyl- and delta-methyl-epsilon-caprolactones. The copolymer possessed a reduced viscosity value of 1.1 (in benzene). The copolymer was prepared by conducting the polymerization reaction in the presence of dibutyl zinc. The resulting mixture then was fluxed on a steam-heated two-roll mill maintained at 158° C. The plasticized composition had the properties set forth in Table XI.

TABLE XI

| | |
|---|---|
| Milled, minutes/° C. | 5/158 |
| Tensile strength, p.s.i. | 2100 |
| Elongation, percent | 500 |
| Load at 100% elongation, p.s.i. | 1140 |
| Instron stiffness modulus, at 25° C., p.s.i. | 810 |
| $T_f$, ° C. | −20 |
| $T_4$, ° C. | −3 |
| $T_B$, ° C. | −64 |

EXAMPLE 39

Poly(vinyl chloride) was mechanically mixed with 1.5 weight percent stabilizer and 45 weight 70 epsilon-caprolactone/30 isomeric mixture of methyl-epsilon-caprolactone copolymer, both based on the weight of said poly-(vinyl chloride). The copolymer possessed a reduced viscosity value of 4.8 and was prepared by conducting the polymerization reaction in the presence of dibutyl zinc. The resulting mixture then was fluxed on a steam-heated, two-roll mill maintained at 158° C. for a period of 5 minutes. The plasticized composition had the properties set forth in Table XII below.

TABLE XII

| | |
|---|---|
| Tensile strength, p.s.i. | 1950 |
| Elongation, percent | 575 |
| Load at 100% elongation, p.s.i. | 820 |
| Instron stiffness modulus, at 25° C., p.s.i. | 1021 |
| $T_f$, ° C. | −21.5 |
| $T_4$, ° C. | −4 |
| $T_B$, ° C. | −64 |

EXAMPLE 40

Poly(vinyl chloride) was mechanically mixed with a barium-cadmium laurate stabilizer and 70 weight percent 75 epsilon-caprolactone/25 beta-propiolactone copolymer, based on the weight of said poly(vinyl chloride). The copolymer was prepared by conducting the polymerization reaction in the presence of dibutyl zinc catalyst. Thereafter, the resulting mixture was fluxed on a steam-heated, two-roll mill maintained at elevated temperatures. The plasticized composition had the properties set forth in Table XIII below.

TABLE XIII

| | |
|---|---|
| Shore A hardness | 74 |
| $T_4$, ° C. | 6 |
| $T_B$, ° C. | −10 |
| Extraction: oil | Nil |

EXAMPLE 41

Poly(vinyl chloride) was mechanically mixed with 3.0 weight percent of a barium-cadmium laurate stabilizer, 0.5 weight percent stearic acid, and 70 weight percent 92-epsilon-caprolactone/8-trimethylvalerolactone copolymer, all based on the weight of said poly(vinyl chloride). The copolymer which had a reduced viscosity in chloroform of 1.14 was prepared by conducting the polymerization reaction in the presence of dibutylzinc catalyst. Thereafter the resulting mixture was fluxed on a steam-heated, two-roll mill at elevated temperatures. The plasticized composition had the properties set forth in Table XIV below.

TABLE XIV

| | |
|---|---|
| Shore A hardness | 68 |
| $T_4$, ° C. | 4 |
| $T_B$, ° C. | −28 |
| Extraction: | |
| Oil | Nil |
| Water | 3.1 |

EXAMPLE 42

In order to demonstrate the superior plasticizing ability of the high molecular weight copolyesters over the corresponding low molecular weight material, copolyesters of 80:20 epsilon-caprolactone/delta-valerolactone having reduced viscosities of 2.2 and 0.68 were added to green linoleum on a two-roll mill at about 70° C. Addition of 20 percent, by weight, of the higher molecular-weight copolyester caused a marked improvement in processing behavior of the green linoleum and resulted in a tougher milled sheet, which could be bent double without cracking. A milled sheet of unmodified green linoleum was cheesy and cracked readily on bending. The low-molecular-weight copolyester used in the same weight ratio produced a soft and sticky mass which required scraping from the mill, even when the roll temperature was dropped to 40 C.

In the following Examples 43 through 58, unless otherwise specified, all percentages and parts are by weight, all temperatures are on the centigrade scale, and all reduced viscosities are measured at a concentration of 0.2 gram of polymer in 100 milliliters of benzene at about 30 C. Figures given for physical properties in the tables below are averages of test results on two or more samples of each material and, in some instances, such averages have been rounded off.

The testing for physical properties was done on an Instron tensile tester using specimens about ¼ inch wide, 0.020 to 0.30 inch thick and about one inch in gauge length. Gauge length is the length of the specimen between the jaws of testing apparatus. The secant modulus or stiffness was determined at a strain rate of 10% in inches per inch per minute and the other tensile property at a strain rate of 100% in inches per inch per minute. minute.

Secant modulus or stiffness

This value was determined by subjecting the specimen to tensile stress and elongating it 1%. The modulus is then calculated as the ratio of the tensile stress (T) needed to elongate the sample 1% of its original length to the elongation (or strain) of the specimen.

1% secant modulus for 1 in. specimen=$T/0.01=100T$

Yield stress

This value was determined as the stress at the first major break in the stress-strain curve and usually corresponds to the necking-in point.

Tensile strength or ultimate strength

This value was determined as the tensile stress at rupture of the specimen. It was calculated from the load on the specimen at rupture, divided by the original cross-sectional area.

Elongation

This value was determined as the extension of the specimen at the point of break or rupture.

$$\text{Percent elongation} = \frac{L-L_0}{L_0} \times 100\%$$

$L$=length at rupture
$L_0$=initial length of specimen.

Rupture energy

This value was determined as the area under the entire stress-strain curve when the sample is subjected to tensile stress up to the rupture point.

Strain rate

This value is the rate at which the sample is being elongated relative to its original dimension. Thus, if a one inch gauge length sample is used and the cross head of the testing apparatus is driven at a speed of one inch per minute, the strain rate is the ratio of gauge length to this speed or one inch divided by one inch per minute which is a rate of one inch per inch per minute. This value is reported hereinbelow as a percent, in which case the ratio is multiplied by 100%.

EXAMPLE 43

The cyclic ester polymer (PCL) used in this example was prepared by the dispersion polymerization of epsilon-caprolactone in heptane using vinyl chloride/lauryl methacrylate copolymer as interfacial agent and triisobutylaluminum as catalyst and had a reduced viscosity of 1.89. The ABS polymer employed was an acrylonitrile-butadiene-styrene polymer (Cycolac H 1000 by Borg-Warner Corp.) having a specific gravity of about 1.02. Blends were prepared from the PCL and the ABS polymer in the proportions shown in Table XV below. The blends were prepared on a two-roll mill using the respective milling conditions shown in Table XV. Thereafter, each blend was compression molded into plaques under a pressure of 1500 p.s.i. for 10 seconds at a temperature of 140 to 155° C. A control sample of ABS polymer containing no PCL was also milled under the conditions shown in Table XV and compression molded under the above conditions. Rectangular pieces of the resulting molded plaques were tested for physical properties in an Instron tensile tester and the results are given in Table XV, at a strain rate of 100% (in./in./min.). The 1% secant modulus values were obtained at 10% strain rate (in./in./min.). The Izod impact strengths reported in the table were determined by the Izod test on ½ inch by ⅛ inch notched bars.

As shown by the table, the ABS polymer and PCL quite remarkably blended with each other to provide blends having good physical properties over the entire composition range from 10 to 90% PCL. This example demonstrates the ability of PCL to act as a plasticizer for ABS polymers without significant loss of tensile strength. It is also noteworthy that the Izod impact strength increased with increasing amounts of PCL. Elongation and rupture energy were increased with increasing amounts of PCL and the stiffness modulus (1% secant modulus) and the heat distortion temperature decreased with increased amounts of PCL. The plasticizing effect of PCL also allows shaping of the blends containing ABS and PCL at lower temperatures without losing room temperature tensile strength.

TABLE XV

| | | | | |
|---|---|---|---|---|
| Wt. percent PCL | 0 | 10 | 50 | 90 |
| 1% secant modulus, p.s.i | 110,000 | 100,000 | 60,000 | 40,000 |
| Yield stress, p.s.i | 4,600 | 3,900 | 2,500 | 1,900 |
| Tensile strength, p.s.i | 3,800 | 3,400 | 3,800 | 6,200 |
| Elongation, percent | 33 | 200 | 670 | 1,450 |
| Rupture energy, in. lbs./in.$^3$ | 1,550 | 6,300 | 20,000 | 44,000 |
| Izod impact strength, ft. lbs./in | 5.38 | 7.82 | 12.1 | |
| Heat distortion temperature, ° C | 94 | 82 | | |
| Milling temperature, ° C | 145 | 145 | 145 | 145 |
| Milling time, min | 5 | 10 | 10 | 5 |

EXAMPLE 44

The cyclic ester polymer used in this example was made by the solution polymerization of epsilon-caprolactone in toluene using 2.0 mol percent butyllithium as catalyst and had a reduced viscosity of 0.28.

The poly(vinyl chloride PVC) used had an inherent viscosity of 0.96 to 1.00 (ASTM Method 1243A) and contained 1.5 percent of a barium-cadmium laurate stabilizer (Van Stay HT by R. T. Vanderbilt Co.) based on the weight of PVC.

The PCL and PVC were blended in the ratios specified in Table XVI, and a control sample of PVC with no PCL added was blended, on a two-roll mill at the temperatures and for times given in the table. The milling behavior was good in all instances. The control sample and the blends were sheeted off of the mill. The control sample was compression molded at 5000 p.s.i. and 180° C. for 10 seconds. The 10 percent and 20 percent PCL blends were compression molded at 2500 p.s.i. and, respectively, 170° C. and 175° C. for 10 seconds. The 30 percent and 40 percent PCL blends were both compression molded at 1500 p.s.i. and 160° C. for 10 seconds.

The plaques formed by compression molding were tested for stiffness (1% secant modulus value was obtained at a 10% strain rate, in./in./min.) in an Instron tensile tester and the results are given in Table XVI. These results demonstrate the excellent plasticizing effect of PCL on PVC.

TABLE XVI

| | | | | | |
|---|---|---|---|---|---|
| Parts PVC | 100 | 90 | 80 | 70 | 60 |
| Parts PCL | 0 | 10 | 20 | 30 | 40 |
| 1% secant modulus, p.s.i | 180,000 | 160,000 | 78,000 | 5,000 | 760 |
| Milling time, min | 5 | 5 | 10 | 20 | 25 |
| Milling temperature, ° C | 160 | 160 | 160 | 160 | 160–120 |

EXAMPLE 45

The cyclic ester polymer (PCL) used in this example was prepared in the same manner as that used in Example 43 and had the same reduced viscosity.

The poly(vinyl chloride) (PVC) is the same as that used in Example 44 and the ABS polymer is the same as that used in Example 43.

A blend (PVC/PCL) was first prepared from 85 parts PVC and 15 parts PCL by milling both on a two-roll mill at 160° C. for 10 min. and then sheeting it off.

The ABS and PVC/PCL were blended in the ratios specified in Table XVII, and a control sample of ABS containing no PVC, PCL or PVC/PCL was milled on a two-roll mill at the temperatures and times given in the table. The milling behavior was good in all instances. The ABS control sample and ABS/PVC/PCL blends were sheeted off the mill and were compression molded for 10 seconds under the conditions given in the table to form plaques. The PVC/PCL blend as a control sample was also compression molded for 10 seconds under the conditions specified in the table.

The plaques formed by compression molding were tested for physical properties on an Instron tensile tester and the results are given in the table, at a 100% strain rate (in./in./min.). The 1% secant modulus values were obtained at 10% strain rate (in./in./min.). It was most surprising to discover that these three dissimilar polymers can be blended uniformly over a wide comopsition range to provide blends having valuable physical properties. This example shows that, by the proper selection of proportions of ABS, PVC and PCL blends having a wide variety of valuable and useful properties are attainable.

TABLE XVII

| Wt. percent 85/15 PVC/PCL blend | 0 | 10 | 50 | 90 | 100 |
|---|---|---|---|---|---|
| 1% secant modulus, p.s.i | 110,000 | 116,000 | 140,000 | 160,000 | 160,000 |
| Yield stress, p.s.i | 4,600 | 4,800 | 5,600 | 6,400 | 6,800 |
| Tensile strength, p.s.i | 3,800 | 4,000 | 4,400 | 4,300 | 6,100 |
| Elongation, percent | 33 | 16 | 18 | 240 | 490 |
| Rupture energy, in. lb./in.³ | 1,550 | 770 | 710 | 9,900 | 24,000 |
| Milling temperature, ° C | 145 | 140 | 140 | 140 | 160 |
| Milling time, mins | 5 | 5 | 8 | 5 | 10 |
| Molding temperature ° C | 155 | 150 | 150 | 150 | 175 |
| Molding pressure | 1,500 | 2,000 | 2,000 | 1,500 | 1,500 |

EXAMPLE 46

The cyclic ester polymer (PCL) used in this example was prepared by dispersion polymerization of epsilon-caprolactone in heptane using 3% vinyl chloride/lauryl methacrylate copolymer as interfacial agent and 0.1% triisobutylaluminum as catalyst (percentages based on weight of epsilon-caprolactone) and had a reduced viscosity of 1.89.

The poly(methyl methacrylate) (PMMA) used in this example was a molding grade polymer that had a reduced viscosity of about 0.4 when measured in benzene at 30° C. and at a concentration of 0.2 gm./dl.

The PMMA and PCL were blended in the ratios specified in Table XVIII, and a control sample of PMMA containing no PCL was milled on a two-roll mill at the temperatures and for the times given in the table. The milling behavior was good in all instances. The PMMA control sample and PMMA/PCL blends were sheeted off the mill and were compression molded for 10 seconds under the conditions given in the table to form plaques.

The plaques formed by compression molding were tested for physical properties on an Instron tensile tester and the results are given in the table, at a 100% strain rate (in./in./min.). The 1% secant modulus values were obtained at 10% strain rate (in./in./min.). These two dissimilar polymers blended uniformly over a wide composition range to provide blends having valuable physical properties. The presence of the PCL imparted a plasticizing effect to the PMMA without any unacceptable reduction in other physical properties. In addition, the percent elongation increased as the amount of PCL in the blend increased and the rupture energy similarly increased while increasing the PCL content.

TABLE XVIII

| Wt. percent PCL | 0 | 1 | 10 | 20 | 30 | 40 | 50 | 90 |
|---|---|---|---|---|---|---|---|---|
| 1% secant modulus, p.s.i | 200,000 | 182,000 | 174,000 | 145,000 | 129,000 | 104,000 | 79,000 | 33,000 |
| Yield stress, p.s.i | | | | 6,900 | 5,000 | 4,200 | | 1,580 |
| Tensile strength, p.s.i | 7,600 | 7,400 | 7,300 | 5,600 | 4,400 | 4,100 | 4,300 | 4,400 |
| Elongation, percent | 5 | 6 | 7 | 13 | 32 | 125 | 520 | 1,140 |
| Rupture energy, in. lbs./in.³ | 250 | 300 | 350 | 700 | 1,400 | 5,000 | 18,000 | 27,200 |
| Milling temp., ° C | 135 | 135 | 130 | 140 | 140 | 140 | 135 | 110-135 |
| Milling time, min | 5 | 5 | 5 | 5 | 5 | 5 | 5 | 5 |
| Molding temp., ° C | 150 | 145 | 150 | 140 | 140 | 140 | 160 | 140 |
| Molding pressure, p.s.i | 1,500 | 1,500 | 1,500 | 1,500 | 1,500 | 1,500 | 1,500 | 1,000 |

EXAMPLE 47

The cyclic ester polymer (PCL) used in this example was prepared in the same manner as that used in Example 46 and had the same reduced viscosity.

The poly(vinyl acetate) (PVA) used in this example is a 100% vinyl acetate homopolymer that has an approximate inherent viscosity of 0.68 dl./gm. when determined by ASTM D 1243 (Procedure A) and an approximate specific gravity of 1.18.

The PVA and PCL were blended in the ratios specified in Table XIX, and a control sample of PVA containing no PCL was milled, on a two-roll mill at the temperatures and for the times given in the table. The milling behavior was fair to good at the proper temperature in all instances. The PVA control sample and the PVA/PCL blends were sheeted off the mill and were compression molded for 10 seconds under the conditions given in the table to form plaques.

The plaques formed by compression molding were tested for physical properties on an Instron tensile tester and the results are given in the table, at a 100% strain rate (in./in./min.). The 1% secant modulus values were obtained at 10% strain rate (in./in./min.). This example illustrates that these two dissimilar polymers can be blended uniformly over a wide composition range to provide blends having valuable physical properties. The example also shows that PVA can be readily plasticized with PCL. The presence of PCL not only reduced the stiffness of the PVA but also increased the percent elongation and rupture energy.

TABLE XIX

| Wt. percent PCL | 0 | 1 | 10 | 20 | 30 | 40 | 50 | 90 |
|---|---|---|---|---|---|---|---|---|
| 1% secant modulus, p.s.i | 200,000 | 190,000 | 180,000 | 67,000 | 70,000 | 60,000 | 21,600 | 21,800 |
| Yield stress, p.s.i | | | 5,300 | 2,900 | 3,300 | 2,300 | 1,500 | 1,600 |
| Elongation, percent | 8 | 5 | 9 | 670 | 680 | 740 | 1,270 | 1,200 |
| Rupture energy, in. lbs./in.³ | 333 | 350 | 150 | 16,000 | 16,000 | 17,000 | 24,000 | 40,000 |
| Milling temp., ° C | 90 | 135 | 60-80 | 50-100 | 50-100 | 75-100 | 90 | 90 |
| Milling time, min | 5 | 10 | 5 | 5 | 5 | 5 | 5 | 5 |
| Molding temp., ° C | 115 | 145 | 110 | 120 | 130 | 130 | 115 | 115 |
| Molding pressure, p.s.i | 1,500 | 1,500 | 1,500 | 1,000 | 1,500 | 1,500 | 1,000 | 1,000 |

EXAMPLE 48

The cyclic ester polymer (PCL) used in this example was prepared in the same manner as that used in Example 46 and had the same reduced viscosity.

The styrene-acrylonitrile copolymer used in this example contained about 74 weight percent styrene and about 26 weight percent acrylonitrile and, in dimethylformamide at 30° C., it had a reduced viscosity of about 0.7 dl./gm. when measured at a concentration of 0.2 gm./100 ml.

The copolymer and PCL were blended in the ratios specified in Table XX, and a control sample of copolymer containing no PCL was milled, on a two-roll mill at the temperatures and for the times given in the table. The milling behavior was fair to good in most instances. The copolymer control sample and the copolymer/PCL blends were sheeted off the mill and were compression molded for 10 seconds under the conditions given in the table to form plaques.

The plaques formed by compression molding were tested for physical properties on an Instron tensile tester and the results are given in the table, at a 100% strain rate (in./in./min.). The 1% secant modulus values were obtained at 10% strain rate (in./in./min.). This example illustrates that these two dissimilar polymers can be blended uniformly over a wide composition range to provide blends having valuable physical properties. The PCL not only plasticized the copolymer as illustrated by the reduction in stiffness at percentages of PCL of 15% or more but also the example illustrates the increase in percent elongation and rupture energy in the presence of PCL.

TABLE XX

| Wt. percent PCL | 0 | 1 | 10 | 15 | 20 | 30 | 40 | 50 | 90 |
|---|---|---|---|---|---|---|---|---|---|
| 1% secant modulus, p.s.i | 207,000 | 216,000 | 212,000 | 182,000 | 149,000 | 67,000 | 176,000 | 19,200 | 23,000 |
| Yield stress, p.s.i | | | | | | 2,700 | | | 1,300 |
| Tensile strength, p.s.i | 8,400 | 8,900 | 8,900 | 10,000 | 6,950 | 3,000 | 3,160 | 3,750 | 5,100 |
| Elongation, percent | 6 | 5 | 7 | 9 | 11 | 450 | 750 | 980 | 1,350 |
| Rupture energy, in. lbs./in.$^3$ | 280 | 280 | 320 | 620 | 1,200 | 11,000 | 14,000 | 19,100 | 32,300 |
| Milling temp., ° C | 140 | 135 | 145 | 150 | 150 | 150 | 140 | 140 | 140 |
| Milling time, min | 5 | 5 | 2 | 5 | 5 | 5 | 5 | 5 | 5 |
| Molding temp., ° C | 160 | 150 | 165 | 160 | 150 | 150 | 150 | 150 | 150 |
| Molding pressure, p.s.i | 1,500 | 1,500 | 2,000 | 1,000 | 1,500 | 1,000 | 1,000 | 1,500 | 1,500 |

EXAMPLE 49

The cyclic ester polymer (PCL) used in this example was prepared in the same manner as that used in Example 46 and had the same reduced viscosity.

The poly(vinyl formal) (PVF) used in this example contained about 7% vinyl alcohol, 12% vinyl acetate, and the remainder poly(vinyl formal). It had a molecular weight of about 70,000.

The PVF and PCL were blended in the ratios specified in Table XXI on a two-roll mill at about 175° C. for 5 minutes. The milling behavior was good in all instances except that roll release was fair to poor. The PVF/PCL blends were sheeted off the mill and were compression molded to form plaques. A sample of the same PVF containing no PCL was also compression molded to form plaques.

The plaques formed by compression molding were tested for physical properties on an Instron tensile tester and the results are given in the table, at a 100% strain rate (in./in./min.). The table shows a decrease in the 1% secant modulus or stiffness, thus illustrating plasticization of PVF. In addition, the percent elongation and rupture energy were increased with increasing amounts of PCL and the remaining properties continued at acceptable levels.

TABLE XXI

| Percent PCL | 0 | 1 | 10 | 50 | 90 |
|---|---|---|---|---|---|
| Rupture energy, in. lbs./in.$^3$ | 7,710 | 15,932 | 16,821 | 13,714 | 41,462 |
| Elongation, percent | 105 | 219 | 247 | 330 | 1,447 |
| Tensile strength, p.s.i | 7,620 | 8,842 | 8,907 | 5,383 | 5,070 |
| Yield stress, p.s.i | 9,024 | 7,910 | 6,818 | 3,917 | 2,061 |
| 1% secant modulus, dynes/cm.$^2$ | 15.59×10$^9$ | 14.38×10$^9$ | 12.28×10$^9$ | 6.72×10$^9$ | 2.33×10$^9$ |

EXAMPLE 50

The cyclic ester polymer (PCL) used in this example was prepared in the same manner as that used in Example 46 and had the same reduced viscosity.

The poly(vinyl butyral) (PVB) used in this example contains about 0.3% by weight vinyl acetate and has a 19% hydroxyl content is calculated as vinyl alcohol. It has an approximate inherent viscosity of 0.90 dl./gm. when measured according to ASTM D 1243 (Procedure A) and an approximate specific gravity of 1.12.

The PVB and the PCL were blended in the ratios specified in Table XXII, on a two-roll mill at a temperature of 100 to 115° C. for 5 to 10 minutes. The milling behavior was good in all instances except that roll release and hot strength were fair, but acceptable. The PVB/PCL blends were sheeted off the mill and were compression molded to form plaques. A portion of the same PVB containing no PCL was also compression molded to form plaques.

The plaques formed by compression molding were tested for physical properties on an Instron tensile tester and the results are given in the table, at a 100% strain rate (in./in./min.). The results shown in the table illustrate the plasticization of PVB as shown by a reduction in 1% secant modulus or stiffness. In addition, the percent elongation increased as well as rupture energy with increasing PCL content. The remaining physical properties continued at acceptable levels.

TABLE XXII

| Percent PCL | 0 | 1 | 10 | 50 | 90 |
|---|---|---|---|---|---|
| Rupture energy, in. lbs./in.$^3$ | 8,721 | 16,622 | 16,319 | 15,841 | 45,084 |
| Elongation, percent | 191 | 313 | 354 | 500 | 1,490 |
| Tensile strength, p.s.i | 6,003 | 7,160 | 6,440 | 4,629 | 5,894 |
| Yield stress, p.s.i | 5,748 | 6,919 | 5,553 | 2,740 | 2,094 |
| 1% secant modulus, dynes/cm.$^2$ | 12.58×10$^9$ | 10.22×10$^9$ | 9.13×10$^9$ | 4.68×10$^9$ | 2.6910 |

EXAMPLE 51

The cyclic ester polymer (PCL) used in this example was prepared in the same manner as that used in Example 46 and had the same reduced viscosity.

The poly(vinyl chloride vinylidene chloride) used in this example contained, on a weight ratio, approximately 80% vinyl chloride and 20% vinylidene chloride and had a reduced viscosity of about 1.22 in cyclohexanone at 30° C. The copolymer also contained about 1½% of a barium-cadmium laurate stabilizer (Van Stay HT) except for the 40% blend shown below which contained no stabilizer (percentages based on weight of copolymer). The copolymer and PCL were blended in the ratios specified in Table XXIII and a control sample of the copolymer containing no PCL was malled, on a two-roll mill at the temperatures and for the times given in the table. Milling behavior was good in all instances. The copolymer control sample and the copolymer/PCL blends were sheeted off the mill and were compression molded for 10 seconds under the conditions given in the table to form plaques.

The plaques formed by compression molding were tested for phyiscal properties on an Instron tensile tester and the results are given in the table, at a 100% strain rate (in./in./min.). This example illustrates the uniform blending of these two dissimilar polymers over a wide composition range to provide blends having valuable physical properties. The drop in 1% secant modulus for these blends containing PCL illustrates the effect of the PCL in plasticizing the copolymer. In addition, the presence of PCL increases the percent elongation and, in particular, the 40% blend was a tough, very elastic composition.

TABLE XXIII

| Percent PCL | 0 | 10 | 40 | 50 | 90 |
|---|---|---|---|---|---|
| Rupture energy, in. lbs./in.$^3$ | 14,799 | 12,926 | 8,473 | 40,677 | 47,852 |
| Elongation, percent | 270 | 331 | 1,157 | 1,551 | 1,733 |
| Tensile strength, p.s.i. | 6,653 | 5,070 | 1,512 | 5,408 | 6,673 |
| Yield stress, p.s.i. | 6,317 | 3,560 | | | 116 |
| 1% secant modulus, dynes/cm.$^2$ | 10.97×10$^9$ | 6.68×10$^9$ | 3.95×10$^7$ | 1.64×10$^8$ | 1.52×10$^9$ |
| Milling temp., °C | 160 | 170 | 140–165 | 150 | 90–110 |
| Milling time, min. | 5 | 4 | 5 | 5 | 5 |
| Molding temp., °C | 160 | 185 | 170 | 150 | 110 |
| Molding pressure, p.s.i. | 1,000 | 1,500 | 1,500 | 1,000 | 1,000 |

EXAMPLE 52

The cyclic ester polymer (PCL) used in this example was prepared in the same manner as that used in Example 46 and had the same reduced viscosity.

The methacrylate-styrene copolymer used in this example contained 50 weight percent of methyl methacrylate and 50 weight percent of styrene and had a reduced viscosity of about 1.3 dl./gm. when measured in benzene at 30° C. and at a concentration of 0.2 gm./dl.

The copolymer and PCL were blended in the ratios specified in Table XXIV on a two-roll mill at 150 to 160° C. for about 10 minutes. The milling behavior was good in almost all instances except for roll release which was fair to good and the copolymer was difficult to flux and disperse in the 90% blend. The copolymer/PCL blends were sheeted off the mill and were compression molded to form plaques. A portion of the copolymer containing no PCL was also compression molded to form plaques as control samples.

The plaques formed by compression molding were tested for physical properties on an Instron tensile tester and the results are given in the table, at a 100% strain rate (in./in./min.). This example illustrates that these two dissimilar polymers can be uniformly blended to form blends having valuable physical properties. The example also illustrates the plasticization of polystyren as shown by the reduction in 1% secant modulus with increasing PCL content. In addition, the rupture energy and the percent elongation increased with increasing PCL content while the remaining physical properties continued at acceptable levels.

TABLE XXIV

| Percent PCL | 0 | 10 | 50 | 90 |
|---|---|---|---|---|
| Rupture energy, in. lbs./in.$^3$ | 400 | 182 | 4,569 | 8,049 |
| Elongation, percent | 7 | 5 | 118 | 420 |
| Tensile strength, p.s.i. | 9,472 | 6,273 | 3,850 | 1,874 |
| Yield stress, p.s.i. | | | 4,280 | 2,354 |
| 1% secant modulus, dynes/cm.$^2$ | 15.06×10$^9$ | 12.24×10$^9$ | 7.07×10$^9$ | 2.80×10$^9$ |

EXAMPLE 53

The cyclic ester polymer (PCL) used in this example was prepared in the same manner as that used in Example 46 and had the same reduced viscosity.

The polystyrene (PS) used in this example was general purpose polystyrene and had specific gravity of about 1.05 and a reduced viscosity of about 1.0 dl./gm. when measured in benzene at 30° C. and at a concentration of 0.2 gm./100 cc.

The PS and PCL were blended in the ratios specified in Table XXV, and a control sample of PS containing no PCL was milled, on a two-roll mill at 145° C. for about 5 minutes. The milling behavior was good except that the 90% PCL blend had a poor roll release characteristic. The PS control sample and the PS/PCL blends were sheeted off the mill and were compression molded to form plaques.

The plaques formed by compression molding were tested for physicial properties on an Instron tensile tester and the results are given in the table, at a 100% strain rate (in./in./min.). The results illustrate that these two dissimilar polymers can be uniformly blended over a wide composition range to provide blends having valuable physical properties. This example illustrates the plasticization of the copolymer by PCL as illustrated by the drop in 1% secant modulus with increasing PCL content. In addition, the rupture energy increased and percent elongation increased while the remaining physical properties continued at acceptable levels.

TABLE XXV

| Percent PCL | 0 | 1 | 10 | 50 | 90 |
|---|---|---|---|---|---|
| Rupture energy, in. lbs./in.$^3$ | 141 | 149 | 442 | 1,117 | 51,778 |
| Elongation, percent | 4 | 4 | 10 | 32 | 1,620 |
| Tensile strength, p.s.i. | 5,800 | 5,730 | 5,397 | 3,715 | 6,109 |
| Yield stress, p.s.i. | | | | 5,702 | 3,800 | 1,870 |
| 1% secant modulus, dynes/cm.$^2$ | 15.00×10$^9$ | 14.89×10$^9$ | 12.90×10$^9$ | 7.22×10$^9$ | 2.19×10$^9$ |

EXAMPLE 54

The cyclic ester polymer (PCL) used in this example was prepared in the same manner as that used in Example 46, and had the same reduced viscosity.

The impact resistant polystyrene used in this example contained about 6 percent of a cis-polybutadiene polymer as the impact modifier. It had a specific gravity of about 1.03, an Izod impact of 1.35 ft./lbs./in., and heat distortion temperature 185° F.

The impact polystyrene and PCL were blended in the ratios specified in Table XXVI, and a control sample of impact polystyrene containing no PCL was milled, on a two-roll mill at about 145° C. for 5 minutes. The milling behavior was good in all instances except that roll release for the 90% blend was somewhat poor. The impact polystyrene control sample and the impact polystyrene/PCL blends were sheeted off the mill and were compression molded to form plaques.

The plaques formed by compression molding were tested for physical properties on an Instron tensile tester and the results are given in the table, at a 100% strain rate (in./in./min.). The data given in the table illustrate plasticization of impact polystyrene with PCL as illustrated by the reduction of 1% secant modulus as the PCL content increased. In addition, at the 50% PCL level, or higher, the rupture energy and percent elongation increased with increasing PCL content.

TABLE XXVIII

| Type polymerization | Solution in toluene | Bulk | Solution in toluene | Solution in toluene |
|---|---|---|---|---|
| Reduced viscosity, dl./gm. | 0.11 | 0.26 | 0.53 | 0.77 |
| 1% secant modulus, p.s.i. | 650 | 1,040 | 860 | 970 |

TABLE XXVI

| | | | | | |
|---|---|---|---|---|---|
| Percent PCL | 0 | 1 | 10 | 50 | 90 |
| Rupture energy, in. lbs./in.$^3$ | 290 | 164 | 255 | 9,834 | 49,753 |
| Elongation, percent | 7 | 5 | 5 | 329 | 1,679 |
| Tensile strength, p.s.i. | 5,249 | 5,081 | 4,816 | 3,131 | 5,720 |
| Yield stress, p.s.i. | | | | 3,069 | 1,913 |
| 1% secant modulus, dynes/cm.$^2$ | 14.12×10$^9$ | 10.70×10$^9$ | 9.42×10$^9$ | 5.74×10$^9$ | 2.37×10 |

EXAMPLE 55

The cyclic ester polymer (PCL) used in this example was prepared in the same manner as that used in Example 46 and had the same reduced viscosity.

The partially hydrolyzed poly(vinyl acetate) (PVAL) used in this example was prepared from a poly(vinyl acetate) homopolymer that had an inherent viscosity of 0.44 dl./gm. when measured in cyclohexanone at 30° C. and at a concentration of 0.2 gm./100 ml. This homopolymer then was hydrolyzed to the extent that 31% of the acetate groups were converted to hydroxyl groups.

The PVAL and the PCL were blended in the ratios specified in Table XXVII, and a control sample of PVAL containing no PCL was milled, on a two-roll mill. The PVAL control sample and the PVAL/PCL blends were sheeted off the mill and compression molded to form plaques.

The plaques formed by compression molding were tested for physical properties on an Instron tensile tester and the results are given in the table, at 100% strain rate (in./in./min.). This example illustrates the plasticization of PVAL as illustrated by the reduction in 1% Secant Modulus with increasing amounts of PCL content. In addition, at levels of PCL above 50%, the percent elongation and rupture energy and tensile strength increased with increasing amounts of PCL content.

EXAMPLE 57

The cyclic ester polymer (PCL) used in this example was prepared in the same manner as that used in Example 46 and had the same reduced viscosity.

The poly(acrylonitrile) (PAN) used in this example had a reduced viscosity in dimethylformamide of about 2.99.

The PAN and PCL are blended in ratios of 1% PCL, 10% PCL, 50% PCL and 90% PCL, the remaining percentages representing PAN.

EXAMPLE 58

The ethylene/acrylic acid copolymer used in this example had a melt index of about 200–300 decigram/min. and an acrylic acid content of about 20%.

The cyclic ester polymer (PCL) used was that previously described in Example 43.

The two polymers were blended on a cold two-roll mill (cold—starts at R.T. and the only heat introduced comes from frictional build-up during milling). Milling time was 15 min. Milling behavior is described in Table IV. Plaques were compression molded from the blend and strips about ¼ in. wide, 1 in. long and 0.030 in. thick were tested in an Instron tensile tester. The average tensile properties of two or more tests are summarized in Table XXIX.

TABLE XXVII

| | | | | | |
|---|---|---|---|---|---|
| Percent PCL | 0 | 1 | 10 | 50 | 92 |
| Rupture energy, in. lbs./in.$^3$ | 5,820 | 175 | 522 | 5,094 | 35,490 |
| Elongation, percent | 360 | 5 | 15 | 260 | 1,482 |
| Tensile strength, p.s.i. | 1,899 | 5,365 | 3,264 | 2,127 | 4,582 |
| Yield stress, p.s.i. | | | | 2,951 | 1,811 |
| 1% secant modulus, dynes/cm.$^2$ | 2.43×10$^9$ | 12.43×10$^9$ | 9.50×10$^9$ | 5.23×10$^9$ | 2.22×10$^9$ |

EXAMPLE 56

The cyclic ester polymers (PCL) used in this example were prepared by the type polymerization designated in Table XXVIII below using dibutylzinc catalyst and their respective reduced viscosities are also correspondingly listed in the table.

Forty parts of each PCL were blended with 60 parts of a poly(vinyl chloride) (PVC) having an inherent viscosity of 0.96 to 1.0 (ASTM 1243A) on a two-roll mill at 160° C. for 25 minutes. In each case 0.9 parts of barium-cadmium laurate stabilizer (Van Stay HT by R. T. Vanderbilt Co.) was used. Milling behavior was good in all cases. The milled stock in each case was removed from the two-roll mill as a sheet and portions of the sheets were compression molded into plaques which were tested in an Instron tensile tester to determine the 1% secant modulus, values which are given in Table XXVIII.

TABLE XXIX

Properties of ethylene/acrylic acid copolymer—PVL blends

| | | |
|---|---|---|
| Wt. percent PCL | 1 | 10. |
| 1% secant modulus, p.s.i. | 37,000 | 37,000. |
| Tensile strength | 2,200 | 2,000. |
| Percent elongation | 830 | 800. |
| Rupture energy | 11,000 | 9,600. |
| Milling behavior: | | |
| Fluxing, banding, dispersion | Good | Good. |
| Bank | Rolling | Rolling. |
| Roll release | Fair | Fair. |
| Hot strength | do | Do. |

What is claimed is:

1. A plasticized composition consisting essentially of a thermoplastic vinyl chloride resin and, as a plasticizer therefor, a plasticizing amount of a polymer of the group consisting of (A) solid non-initiated linear homopolymers of lactones, said lactones being of the group consisting of the unsubstituted and substituted delta-valerolactones, the epsilon-caprolactones, and the zeta enantholactones, said homopolymers being characterized by a reduced viscosity value of at least about 0.8 as determined at a concentration of 0.2 gram of said homopolymers per 100 milliliters of chloroform at 30° C., (B) solid non-initiated linear homopolymers of lactones, said lactones being of the group consisting of the unsubstituted and substituted oxa-delta-valerolactones, the oxa-epsilon-caprolactones, and the oxa-zeta-enantholactones, said homopolymers being characterized by a reduced viscosity value of at least about 0.25 as determined at a concentration of 0.4 gram of said homopolymers per 100 milliliters of chloroform at 30° C., and (C) solid non-initiated linear copolymers of lactones, said lactones being of the group consisting of the unsubstituted and substituted delta-valerolactones, the oxa-delta-valerolactones, the epsilon-caprolactones, the oxa-epsilon-caprolactones, the zeta-enantholactones, and the oxa-zeta-enantholactones, said copolymers being characterized by a reduced viscosity value of at least about 0.8 as determined at a concentration of 0.4 gram of said copolymers per 100 milliliters of chloroform at 30° C.;

said homopolymers and copolymers of (A), (B), and (C) above being characterized by the recurring unit:

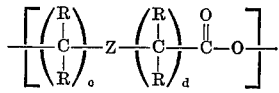

wherein each R, individually, is of the group consisting of hydrogen, alkyl of 1 to 18 carbon atoms, alkoxy of 1 to 18 carbon atoms, and alkoxyalkyl, the alkoxy and alkyl moities of said alkoxyalkyl each having from 1 to 3 carbon atoms; wherein Z is of the group consisting of oxy and

wherein R has the same value as above; wherein $c$ and $d$, individually, are integers having a value greater than zero and less than 4; and wherein the sum of $c$ plus $d$ is an integer greater than 2 and less than 6; with provisos that (a) the sum of $c$ plus $d$ is greater than 2, and (b) no more than three R variables attached to the carbon atoms contained in the aforesaid recurring unit are groups other than hydrogen.

2. The plasticized composition of claim 1 wherein said plasticizer is a solid linear copolymer of epsilon-caprolactone and substituted epsilon-caprolactone.

3. The plasticized composition of claim 1 wherein said plasticizer is a solid linear copolymer of epsilon-caprolactone and substituted delta-valerolactone.

4. The plasticized composition of claim 1 wherein said plasticizer is a solid linear homopolymer of epsilon-caprolactone.

5. The plasticized composition of claim 1 wherein said plasticizer is a solid linear homopolymer of substituted epsilon-caprolactone.

6. The plasticized composition of claim 1 wherein said plasticizer is a solid linear copolymer of epsilon-caprolactone and lower alkyl substituted epsilon-caprolactone.

7. The plasticized composition of claim 6 wherein said linear copolymer contains from about 60 to about 85 parts by weight of epsilon-caprolactone and from about 40 to about 15 parts by weight of lower alkyl substituted epsilon-caprolactone.

8. The plasticized composition of claim 7 wherein said lower alkyl substituted epsilon-caprolactone is methyl-epsilon-caprolactone.

9. The plasticized composition of claim 1 wherein said plasticizer is a solid linear copolymer of epsilon-caprolactone and lower alkyl substituted delta-valerolactone.

10. The plasticized composition of claim 9 wherein said lower alkyl substituted delta-valerolactone is 2,4,4-trimethyl-delta-valerolactone.

11. The plasticized composition of claim 1 wherein said plasticizer is a solid linear copolymer of epsilon-caprolactone and 4-keto-m-dioxane.

12. The plasticized composition of claim 1 wherein said resin is poly(vinyl chloride).

13. The plasticized composition of claim 1 wherein said resin is a copolymer of vinyl chloride and vinyl acetate.

14. The plasticized composition of claim 12 wherein said plasticizer is a solid linear copolymer of epsilon-caprolactone and lower alkyl substituted epsilon-caprolactone.

15. The plasticized composition of claim 13 wherein said plasticizer is a solid linear copolymer of epsilon-caprolactone and lower alkyl substituted epsilon-caprolactone.

16. The plasticized composition of claim 12 wherein said plasticizer is a solid linear copolymer which contains from about 60 to about 85 parts by weight of epsilon-caprolactone and from about 40 to about 15 parts by weight methyl substituted epsilon-caprolactone.

17. The plasticized composition of claim 13 wherein said plasticizer is a solid linear copolymer which contains from about 60 to about 85 parts by weight of epsilon-caprolactone and from about 40 to about 15 parts by weight methyl substituted epsilon-caprolactone.

18. The plasticized composition of claim 12 wherein said plasticizer is a solid linear homopolymer of epsilon-caprolactone.

19. The plasticized composition of claim 13 wherein said plasticizer is a solid linear homopolymer of epsilon-caprolactone.

20. A thermoplastic composition comprising about 5 to about 99 weight percent of a thermoplastic vinyl polymer having recurring units which contain at least one chemically bound member from the class consisting of aryl, oxygen, sulfur, nitrogen, and halogen, uniformly blended with about 1 to about 95 weight percent of a solid linear non-initiated cyclic ester polymer containing about 5 to about 100 mol percent of recurring units of the formula:

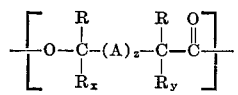

wherein each R, individually, is selected from the class consisting of hydrogen, alkyl, halo, and alkoxy; A is the oxy group; $x$ is an integer from 1 to 4; $y$ is an integer from 1 to 4; $z$ is an integer of zero or one; with the provisos that (a) the sum of $x+y+z$ is at least 2 and not greater than 7, (b) the sum of $x+y+z$ cannot equal 3, and (c) the total number of R variables which are substituents other than hydrogen does not exced 3, having a reduced viscosity value of at least 0.8 as determined at a concentration of 0.2 gram of the polymer per 100 milliliters of chloroform at 300° C.

21. Composition as claimed in claim 20 wherein said cyclic ester polymer has a reduced viscosity of about 0.2 to about 5 determined as specified in claim 20.

22. Composition as claimed in claim 20 wherein said thermoplastic vinyl polymer is poly(vinyl butyral).

23. Composition as claimed in claim 20 wherein said thermoplastic vinyl polymer is poly(vinyl formal).

24. Composition as claimed in claim 20 wherein said thermoplastic vinyl polymer is styrene-acrylonitrile copolymer.

25. Composition as claimed in claim 20 wherein said thermoplastic vinyl polymer is poly(vinyl chloride-vinylidene chloride).

26. Composition as claimed in claim 20 wherein said thermoplastic vinyl polymer is styrene-methylmethacrylate copolymer.

27. Composition as claimed in claim 20 wherein said thermoplastic vinyl polymer is poly(vinyl pyrollidone).

28. Composition as claimed in claim 20 wherein said thermoplastic vinyl polymer is polystyrene.

29. Composition as claimed in claim 20 wherein said thermoplastic vinyl polymer is polyacrylonitrile.

30. Composition as claimed in claim 20 wherein said thermoplastic vinyl polymer is partially hydrolyzed poly (vinyl acetate).

31. Composition as claimed in claim 20 wherein asid thermoplastic vinyl polymer is poly(methyl methacrylate).

32. Composition as claimed in claim 20 wherein said thermoplastic vinyl polymer is poly(vinyl acetate).

33. Composition as claimed in claim 20 wherein said thermoplastic vinyl polymer is an acrylonitrile-butadiene-styrene copolymer.

34. Composition as claimed in claim 33 wherein said composition also contains poly(vinyl chloride).

35. Composition as claimed in claim 20 wherein said cyclic ester polymer is a substantial homopolymer of epsilon-caprolactone.

References Cited

UNITED STATES PATENTS

| | | | |
|---|---|---|---|
| 2,890,208 | 6/1959 | Young et al. | 260—78.3 |
| 3,021,310 | 2/1962 | Cox et al. | 260—78.3 |
| 3,169,945 | 2/1965 | Hostettler et al. | 260—78.3 |

ALLAN LIEBERMAN, Primary Examiner

U.S. Cl. X.R.

260—31.8AN, 31.8C, 31.8DR, 31.8HR, 876, 887, 893, 895, 898, 899, 901